United States Patent [19]

El-Amawy et al.

[11] Patent Number: 4,797,833

[45] Date of Patent: Jan. 10, 1989

[54] MICROPROCESSOR BASED CONTROLLER FOR A THREE PHASE BRIDGE RECTIFIER

[75] Inventors: Ahmed El-Amawy; Ali Mirbod, both of Baton Rouge, La.

[73] Assignee: Louisiana State University, Baton Rouge, La.

[21] Appl. No.: 913,765

[22] Filed: Sep. 30, 1986

[51] Int. Cl.⁴ .................... H02M 7/155; H02P 13/26
[52] U.S. Cl. ................................. 364/483; 363/87; 363/54; 323/219
[58] Field of Search .................. 364/480, 481, 483; 324/87, 98, 101; 323/219, 244, 318, 322, 365, 366, 369; 363/52, 54, 74–76, 84–87, 129

[56] References Cited

U.S. PATENT DOCUMENTS

| | | | |
|---|---|---|---|
| 4,122,517 | 10/1978 | Hayashi et al. | 363/85 |
| 4,150,325 | 4/1979 | Miller et al. | 363/54 |
| 4,156,275 | 5/1979 | Loberg | 363/87 |
| 4,156,896 | 5/1979 | Weiss | 363/87 |
| 4,260,947 | 4/1981 | Massey | 323/322 |
| 4,308,494 | 12/1981 | Gelfand et al. | 323/244 |
| 4,342,063 | 5/1982 | Thörnell | 364/483 |
| 4,399,395 | 8/1983 | Espelage | 363/87 |
| 4,490,780 | 12/1984 | Nondahl | 363/129 |
| 4,577,269 | 3/1986 | Abbondanti | 363/129 |
| 4,631,625 | 12/1986 | Alexander et al. | 364/483 |
| 4,672,555 | 6/1987 | Hart et al. | 364/481 |

Primary Examiner—Parshotam S. Lall
Assistant Examiner—Brian M. Mattson
Attorney, Agent, or Firm—William David Kiesel; Robert C. Tucker; Timothy J. Monahan

[57] ABSTRACT

A method of controlling a six pulse bridge phase controlled rectifier using a microprocessor is provided by the invention herein. The method involves synchronizing an oscillator to the frequency of an ac power source and driving first and second counters with the oscillator. The first counter is used in conjunction with a phase locked loop to monitor and adjust the oscillator frequency. The count of the second counter generates an α value used in a firing angle match routine. The match routine compares the desired output voltage to the cosine of α minus an inductance factor. The match routine takes less than 20 microseconds to run allowing a new α value to be checked every 0.5 degrees for a 60 hertz power source. When a match is found, the thyristors are fired and a reload value projecting a subsequent firing in 60° is calculated for the second counter.

8 Claims, 5 Drawing Sheets

MICROPROCESSOR BASED CONTROLLER FOR A THREE PHASE BRIDGE RECTIFIER

BACKGROUND OF THE INVENTION

1. Field of the Invention

This invention relates in general to three phase, bridge rectifiers used in dc drives, exciters and HVDC systems and more particularly to microprocessor based methods for controlling the firing angles for these rectifiers.

2. Description of the Prior Art

The six pulse bridge phase controlled rectifier is a widely used type of solid state power converter which is used in industry for converting a three phase ac input voltage to a variable dc voltage. The six pulse bridge phase controlled rectifier uses six thyristors as controllable power devices.

These thyristors, acting as power switches are turned on sequentially by the control circuit during each cycle of line voltage. The appropriate turn-on point (firing angle $\alpha$) of the thyristors is determined by the amount of required power flow to the output of the rectifier and is adjusted by the control circuit during each cycle of line voltage.

Prior art control circuits for these converters have taken a number of variations. Most frequently the simplicity of the control circuit for a particular application has been the main consideration. However, the power circuit itself represents the major constituent of total system cost for HVDC transmission and variable voltage fed inverters. There is a need in the art for an advanced firing control scheme capable of meeting higher standard performances which can be used in a variety of applications.

Existing control circuits for the control of thyristors can be catagorized into two groups. The first is a control circuit which uses a conventional voltage controlled oscillator (VCO), a phase comparator and a ring counter to generate gating signals for thyristors. The second group uses a microprocessor to generate the gating signals for the control of the thyristors.

The first group will now be explained in more detail. The input control voltage is generally added to the phase comparator output voltage and applied to the input of the VCO. Thus, a variation of the delay angle is obtained by a temporary change in the VCO frequency. The ultimate change in the delay angle is proportional to the control signal. Control circuits of this design have an integral characteristic being that they can only operate in a closed loop system and the rate of change of firing angle is controlled rather than the firing angle itself. Consequently, in a closed loop system as shown by Sucena-Paiva and Freris, "Stabiity of Rectifiers with Voltage-Controlled Oscillator Firing Systems", Proc. IEE, Vol. 120, No. 6, pp. 667-674, June 1973 and Rumpf and Ranade, "Comparison of Suitable Control Systems for HVDC Stations Connected to Weak ac Systems. Pt. 1-New Control Systems", Vol. PAS - 91, pp. 549-555, 1972. There is a narrow stable operating region, as compared to a converter system with proportional control. Also, the response of such a system is slow, especially if operating in the inverting mode with a large delay angle. (Gupta, Venkatesan and Eapen, "A Generalized Firing Angle Controller Using Phase-Locked Loop for Thyristor Control," IEEE Trans. Ind. Electron. Cont. Inst., Vol. IECI-28 No. 1, pp. 46-49, Feb., 1981). Additionally, the offset and drift in the comparator amplifier changes the firing angle characteristics and the open loop gain of the converter is not constant, especially where the source impedance is considerable.

The second group of control circuits will now be analyzed. In this group the gating signals for the control of thyristors are generated by a microprocessor. For these controllers the converter is assumed to be fed by a strong source, i.e., without any source impedance and with a constant source frequency. The use of these converters with a weak ac system (with variable source frequency and considerable source impedance) may cause short circuits in the ac system and may also cause low frequency oscillations. Furthermore, the control system has a processing delay ranging from 15° to 360°. A disscussion for the 15° end of the range may be found within an article by Olivier, Stefanovic and April, "Microprocessor Controller for a Thyristor Converter with Improved Power Factor," IEEE Tran. Ind. Electron and Cont. Inst., Vol. IECI-28, No. 3, pp. 188-194, Aug. 1981, where the processing delay is found to reflect the time required to perform the firing angle calculation. At the other end of the range around 360°, the processing delay is caused by the nature of the algorithm (Simard and Rajagopalan, "Economical Equidistant Pulse Firing Scheme for Thyristorized dc Drives," IEEE Trans. Ind. Electron. and Cont. Inst., Vol. IECI-22, No. 3, pp. 425-429, Aug. 1975.

Desired characteristics are lacking in both groups of control circuits. Specifically, the prior art is lacking in a fast response control circuit which can operate in an open loop as well as in a closed loop system without introduction of time lag. Please recall the first group presented only worked in a closed loop system. It is also desirable to have a constant open loop voltage gain, i.e., a linear relationship between the output voltage of the converter and the control input voltage. Moreover, it is preferable to extend the operation of the control circuit applications where a weak ac system, such as a small alternator, is feeding the converter. This necessitates the use of a firing angle control circuit that can operate properly over the unregulated frequency range and can compensate for source impedance, both in the synchronization and in the output voltge control circuits. Furthermore, to avoid the generation of undesired noncharacteristic harmonics, jitter free equidistant gating signals are conventionally preferred (Kimbark, "Direct Current Transmission," Wiley, 1971.)

According to Oliver, Stefanovic and April, "Microprocessor Controller for a Thyristor Converter with an Improved Power Factor," IEEE Tran. Ind. Electron and Cont. Inst., Vol. IECI-28, No. 3, pp. 188-194, Aug. 1981. There are several techniques for controlling a converter firing angle, such as: analog comparators, digital counters, phase-locked loops, etc. Pelly, "Thyristors Phase Controlled Converters and Converters, New York: Wiley, 1971; Oliver, Stefanovic and Jamil, "Digital Controlled Thyristor Current Source," IEEE Trans. Ind. Electron and Cont. Inst., Vol. IECI26, No. 3, pp. 185-191, Aug. 1979; Sen, MacDonald and Clarke, "A Novel Equidistant Pulse Control Scheme for Thyristor Converters, " Com. Elec. Eng. J., Vol. 3, No. 3, pp. 10-14, 1978. In almost all these schemes, a firing signal is generated when a time-varying signal becomes equal to a reference signal. The implementation can be analog as with a bias cosine method, Pelly, "Thyristors Phase Controlled Converters and Converters, New York: Wiley, 1971, or digital, as with a ROM look-up table and counters, Oliver, Stefanovic and April, "Microprocessor Controller for a Thyristor Converter with an Improved Power Factor," IEEE Trans. Ind. Electron and Cont. Ins., Vol IECI-26, No. 3, pp. 188-194, Aug. 1981, but the firing angle is always calculated with respect to a zero crossing point of the input-voltage waveform. Consequently, all these schemes may be grouped under the generic term of "absolute firing angle methods." However, since all these methods are not easily emulated by a microprocessor, a different approach more adaptable to software implementation, has been taken and a relative firing method has been developed.

The invention described herein overcomes the difficulties in emulating the analog absolute firing angle methods. Moreover, it provides capabilities that have not been shown to be possible when combined in any analog technique. These capabilities include ½° response, operation with a weak ac system, and source impedance compensation.

To put things in perspective, we summarize the main features of the relativie delay angle approach described by Oliver, et al.

With the "relative firing angle method," the firing angle is controlled by lengthening or shortening the interval between two successive thyristor triggerings. Indeed, in the steady state, this interval, denoted by D, is equal to 60°. A momentary decrease or increase of this interval, respectively, reduces or augments the firing angle $\alpha$, Oliver, Stefanovic and Jamil, et vir.

Also $\alpha$ is corrected by an amount $\epsilon$ every 360° cycle to account for timing imperfections. This is done by starting a counter when the zero crossing signal arrives (the counter counts 1 MHZ clock pulses). At the time $Q_1$ and $Q_6$ are to be fired, the counter should contain what corresponds to $\alpha$. The difference between the counter value and $\alpha$ is $\epsilon$. Thus, by correcting $\alpha$ by $\epsilon$, timing imperfections are accounted for.

During transients, the interval $\Delta$ (represented by the angle between two consecutive firing angles) cannot be negative and is limited to a minimum of 15° by the execution time of the triggering routine. Maximum $\Delta$ is 127° to limit the size of the look-up table.

The software implementation of the relative firing angle approach can be summarized as follows: at the main program (loop), the reference voltage is read and the corresponding value is read from the arccosine table. Following this, the difference between this $\alpha$ and the value of $\alpha$ computed at the end of the last triggering interval is found. This difference is used to lengthen or shorten the next triggering interval.

The problems with the relative firing angle approach can be summarized as:

(1) Changes in the reference input voltage after correction are ignored until the end of the new gating interval which could be as long as 127°.

(2) If the change referred to above (in (1)) calls for a reduction of $\Delta$, it will have to wait for possibly as long as 127°. This degrades the performance.

(3) Since the $\Delta$ counter is driven by a constant frequency source, operation with a weak ac system is impossible. Thus, this approach rules out operation with an unregulated source frequency.

(4) System response is very slow which causes performance degradation.

SUMMARY OF THE INVENTION

Therefore, one object of this invention is a fast response control circuit which can operate in an open loop as well as a closed loop system without introducing a time lag to the system.

Another object of this invention is a control circuit with an open loop voltage gain which gives a linear relationship between the output voltage of the converter and the controller input voltage.

A further object of this invention is a control circuit which will operate correctly even when connected to a weak ac system (such as when a small alternator is feeding the converter.)

A still further object of this invention is a firing angle control circuit that can control $\alpha$ rather than control the rate of change and therefore operate properly over an unregulated frequency range and take into account the effects of source impedance within the synchronization as well as the output voltage control circuits.

An object of this invention is to provide a constant open loop gain where the effect of power source impedance in the projected output voltage is properly compensated.

Another object of this invention is to avoid the generation of undesired noncharacteristic harmonics.

A further object of this invention is a control circuit with a processing delay of the control system of less than 20 microseconds.

A still further object of this invention is to produce a fast and accurate firing angle projection where the firing angle projection occurs every 0.5 degrees or less of time.

Another object of this invention is to obtain and readjust the exact firing point of thyristors independent of source frequency and based on operating conditions.

Still another object of this invention is to produce a control circuit with a fast response with no sub-harmonic oscillation; again, where the processing delay is less than 20 microseconds.

Another object of this invention is to provide a control system which may be used in a wide variety of industrial applications.

A further object of this invention is to provide an advanced firing control scheme capable of meeting higher standard performance at a reduced cost.

PREFERRED EMBODIMENTS OF THE INVENTION

Figure 1A:
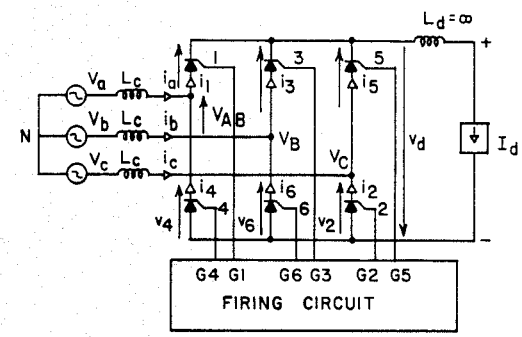
FIGS. 1a-c: Circuit Diagram and Gating Waveforms for the Power Circuit

This invention deals with an advanced general purpose microprocessor-based control circuit for a three phase controlled rectifier. The performance exhibited by the controller is superior to any of the prior art control circuits. The firing angle is smoothly controlled in the 0° to 180° range with a fast response and a constant open loop gain even for circumstances where the converter is fed by a weak ac system of unregulated frequency. The synchronization between the line and the internal voltage controlled oscillator is implemented by an efficient software controlled phase locked loop which takes into account the effect of source impedance in delaying the synchronization pulses. (i.e. The effect of source impedance in delaying the synchronization signal has been properly compensated for by the control circuit.) Moreover, the processing delay of the control system is less than 20 microseconds which is less than available commercial controllers by orders of magnitude. These advantages are obtained by the use of a novel controller built around an 8086 microprocessor.

Specific Contributions of this Invention Include (A) Fast Response and Accurate Firing Angle Projection This microprocessor-based technique projects the firing angle every 0.5 degrees. Consequently, depending on operating conditions the exact firing point of the thyristors can be obtained and readjusted, independent of the source frequency. This readjustment is performed at a rate of six times per cycle with an accuracy of 0.5 degrees and a response time of less than 20 microseconds, close to its theoretical limits. Several problems encountered in the prior art are solved by this new approach:

(1) The slow response and probable sub-harmonic oscillations of the previous designs have been eliminated. In the previous designs, the firing angle adjustment was either done at a rate of one per cycle of source frequency or with a processing delay of more than 15°, i.e. more than 0.5 milliseconds.

(2) The effect of power source impedance in the projected output voltage is properly compensated and the open loop gain of the system remains constant, regardless of the firing angle. In the prior art the effects of source impedance on the output voltage have been ignored. Also, the gain of the converter was a function of the firing angle causing degradation in system response especially when the converter operated within inverting mode.

(B) Variable Source Frequency Operation

With this invention, variations in the power source frequency (within ±5%) do not affect or degrade the performance or operation of the controller. In the prior art designs a change in source frequency either was ruled out or was taken into consideration for synchronization purposes only. Those designs in which frequency changes were ruled out could not operate properly with a weak ac system. In those designs which considered the effect of source frequency variations, the controller performance was subjected to performance degradation. This was caused by inevitable errors in firing angle calculation, as the power source frequency varies.

This invention projects the firing angle every 0.5° (where 360° is equal to one cycle of the source frequency), independent of the source frequency. The half degree clock is obtained by the use of a software controlled variable frequency phase locked loop. (Mirbod and El-Amawy, "A Novel Microprocessor-Based Controller for a Phase Controlled Rectifier Connected to a weak ac System" in Conf. Record, Industry Application Society Annual Meeting, Toronto, Oct. 1985.)

(C) Controller Software

The real time software written for this controller is very efficient by taking full advantage of the 8086 microprocessor architecture and minimizing the response time. The software has been written in assembly language and its distinctive features include:

(1) An efficient Software Controlled Phase Locked Loop which makes variable frequency operation possible.

(2) An error free synchronization routine which synchronizes the thyristor firing signals with the line frequency.

(3) Several timing problems regarding the 8053 timer chip in this particular real time operational environment have been solved by this software.

Power Circuit and Bridge Rectifier Controller

Figure 1B:
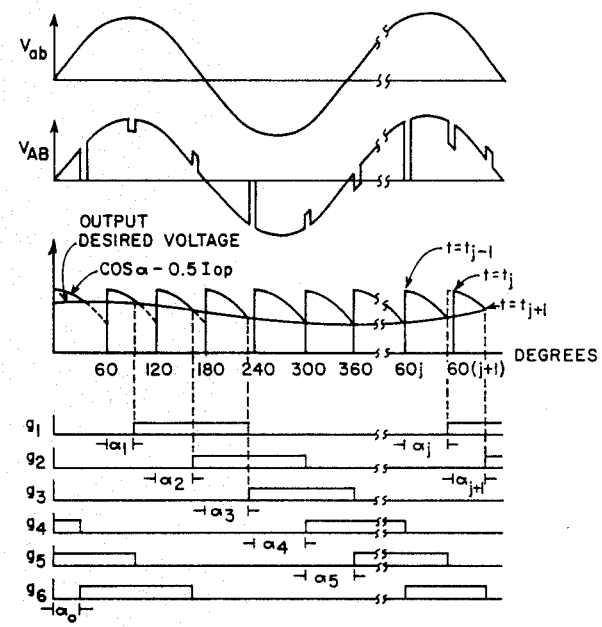
Figure 1C:
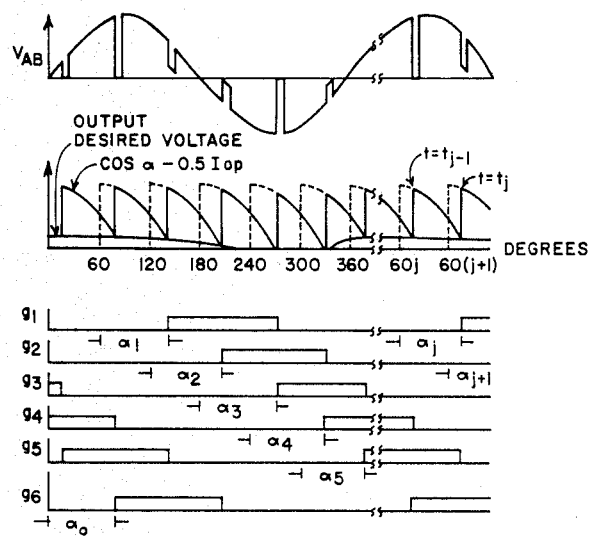

FIG. 1 shows (a) power converter circuit diagram, (b) gating waveforms and reference voltage $V_{AB}$ for $\alpha < 60°$ and (c) gating waveforms and reference voltage $V_{AB}$ for $\alpha > 60°$. The power source consists of a three phase source with a series inductance $L_c$. In a steady state operation, each thyristor conducts for the interval of 120°, in each cycle, and the gating pattern is changed once in every 60° interval. The gating of thyristor $Q_6$ starts with a delay angle $\alpha_0$ with respect to the zero crossing point of $V_{ab}$ (FIG. 1). Delay angle $\alpha$ is related to the per unit output voltage $V_{op}$ and per unit output current $I_{op}$ as $$V_{op} = \cos \alpha - 0.5 \times I_{op} \tag{1}$$

Kimbark, "Direct Current Transmission.", Wiley, 1971, where the second terms in the right hand side of Eqn. (1) reflects the effect of the source impedance. The base values are $$I_b = \frac{E_m}{4\pi f L_c} \tag{2}$$

$$E_b = \frac{3}{\pi} E_m \tag{3}$$

where Em is the peak value of the line to line voltage, $I_o$ is the output current at the instant of commutation and $f_m$ is the source frequency. Having $f_m$, $E_m$, $L_c$ and using an analog multiplier, the per unit output current can be obtained. After issuing a new gating pattern, i.e., after each commutation, the controller reads the per unit current through an analog to digital converter (ADC).

The right hand side of Eqn. (1) is evaluated by calculating $0.5 \times I_{op}$ in real time, and using $\alpha$ to fetch the cosine function from a look-up table. Once every 0.5 degrees, the processor obtains the desired per unit output voltage, and compares it with the right-hand side (R.H.S.) of Eqn. (1) which is calculated at that instant. This comparison uniquely determines the point where a new gating waveform should be applied. Therefore, once both side of Eqn. (1) are equal, or L.H.S.>R.H.S., the gating pattern is advanced.

This new method makes it possible to calculate accurately and select the delay angle based on the desired output voltage at the rate of once every gating interval. Besides, this approach permits the controller to vary $\alpha$ with a resolution of 0.5° without any significant processing time lag. Moreover, the effect of source inductance is accounted for, i.e., by subtracting $0.5 \times I_{op}$ from $\cos \alpha$ in Eqn. (1).

After issuing the gating pattern j at $t_j$, with a delay angle of $\alpha_j$, the processor reads the new value of $I_{op}$ and calculates $0.5 \times I_{op}$ which is used in the next gating interval. At this time, the processor is ready for the calculation of the next firing delay angle, i.e., $\alpha_{j+1}$.

As shown in FIG. 1, for values of $\alpha_j$, greater than 60°, the comparison for obtaining $\alpha_{j+1}$ starts at $t_j$ with the initial delay angle of $\alpha_j - 60°$. For values of $\alpha_j$ less than 60, the processor waits for the interval of $60 - \alpha_j$ degrees, before it starts the estimation of $\alpha_{j+1}$. After the waiting interval, comparison for obtaining $\alpha_{j+1}$ starts with the initial delay angle of zero degrees.

Synchronization of Gating Signals

For the proper operation of the controlled rectifier, the gating patterns should be synchronized with the zero crossing of one of the line to line voltages such as $v_{ab}$. Because of the commutation inductance $L_c$, the fundmental component of line to line voltage across the converter $v_{AB}$ has a delay angle of $\gamma$ with respect to the reference line to line voltage $v_{ab}$. $\gamma$ is given by $$\gamma = \frac{\frac{3}{\pi}\mu\sin\left(\alpha + \frac{\mu}{2}\right)\cos\left(\alpha + \frac{\mu}{2}\right)}{1 - \frac{3}{\pi}\mu\sin^2\left(\alpha + \frac{\mu}{2}\right)} \quad (4)$$

where $\mu$ is the commutation inerval. It is possible to express $\mu$ as $$\mu = \cos^{-1}(\cos\alpha - I_{op}) - \alpha \quad (5)$$

For different values of $\alpha$ and $I_{op}$, angle $\gamma$ can be calculated and stored in a table. In constructing the $\gamma$ look-up table, 32 different values for $I_{op}$ ($I_{op}$=0.0125, 0.025, ...) and 180 different values for $\alpha$ were selected. The size of the $\gamma$ look-up table is 5760 bytes which is stored along with $\cos \alpha$ table in a two-8k EPROM chips.

For sychronizing firing waveforms with $V_{ab}$ and avoiding subharmonics, Hazell and Flower, "Theoretical analysis of harmonic instability in ac-dc converters.", Proc. IEE, Vol. 117, No. 9, pp. 1869–1878, 1970., the line to line voltage across the converter $v_{AB}$ is sensed and passed through a band pass filter followed by a zero crossing detector circuit. The output of zero crossing detector circuit gives synchronization pulses at the angle $\gamma$ with respect to the zero crossing of $v_{ab}$.

This system uses a VCO with a central frequency of $720 \times f_m$ where $f_m$ is the nominal line frequency. The synchronization of VCO frequency with the line frequency is implemented by a software controlled phase locked loop described in the following section.

Control Circuit Description and Operation

Figure 2:
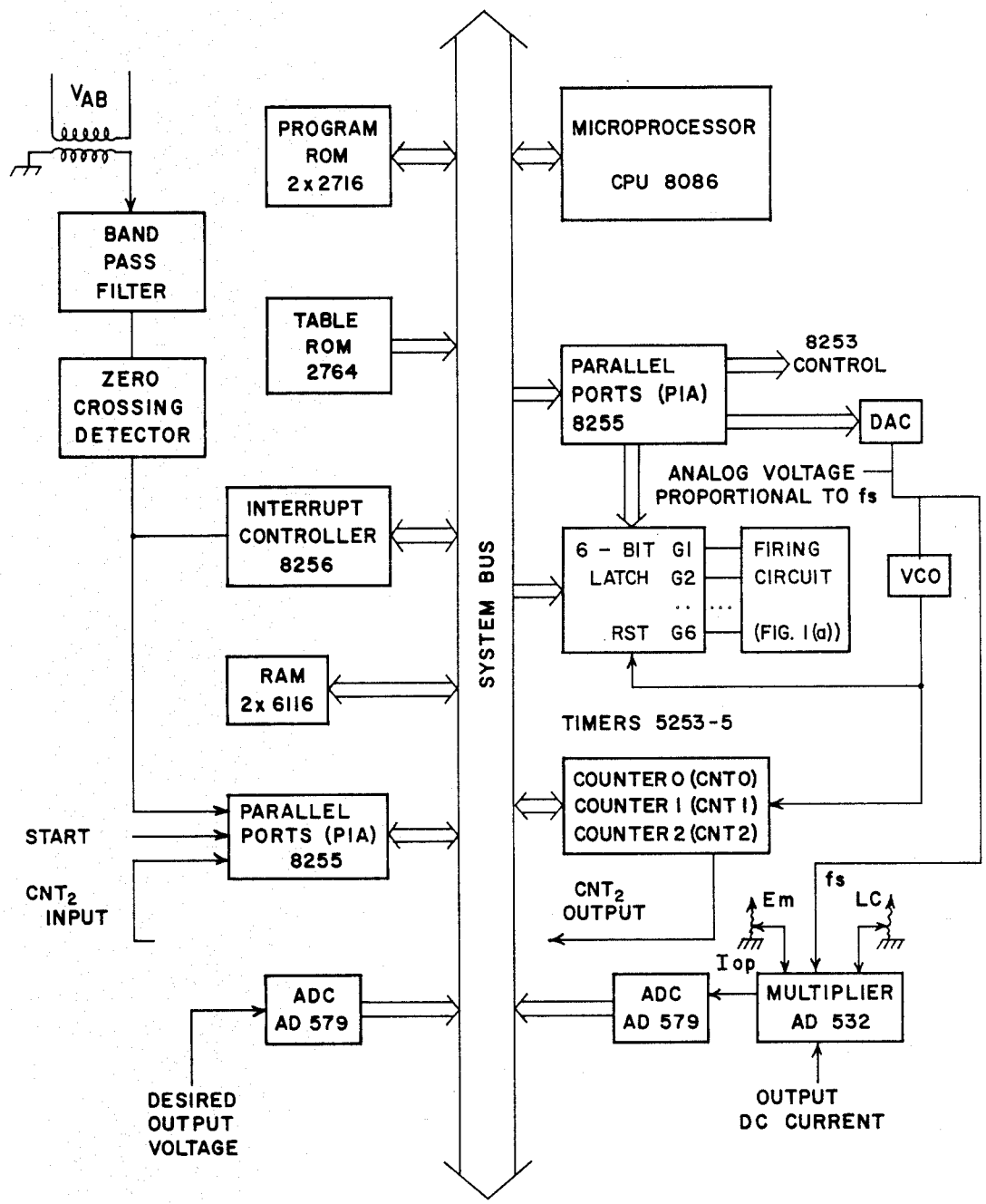
FIG. 2: Control System Block Diagram

A block diagram showing the major components in the digital control circuit is shown in FIG. 2. The control circuit receives different information, such as per unit output dc current and the desired per unit output voltage, in a digital form, through ADC's, which are sampled by the CPU at appropriate time intervals.

The control circuit is built around an 8086 CPU running at 5 MHz. Besides the CPU, the control circuit contains 4K of program PROM (2×2716), 16K of table PROM (2764), 4K of RAM (2×6116-4), two PIA's (2×8255), a programmable timer (8253-5), an interrupt controller (8259), two (10-bit) ADC's and one DAC. The only source of interrupt is the zero crossing signal which interrupts the CPU through the 8259. The CPU processes the received information and generates gating patterns which are applied to the thyristors through an IO port and a 6 bit latch which also chops the waveform with the vco clock.

Circuit operation is best understood if the function of each of the three 16 bit counters, contained in the timer IC (8253-5), is first explained. For obtaining a resolution of 0.5 degrees, all of the counters (CNT0, CNT1 and CNT2) are driven by the VCO. The VCO has a software controlled oscillation frequency of 720 $f_m$ (43.2 kHz for 60 Hz line frequency). The resolution can be further improved by counting in ¼ degrees or less. This would require increasing vco frequency by a factor of two or more, accordingly.

CNT0 is utilized to count the vco clock and is reset once every line cycle. At any instant, the content of this counter shows the angle in respect to the zero crossing of $v_{ab}$. This counter is read, reset and restarted by the interrupt service routine upon the arrival of zero crossing signal, i.e., at the angle $\gamma$. The read value ($\gamma c$) is passed to the main program and the counter is restarted with the initial value of $\gamma_t$, obtained from $\gamma$ table and saved in one of the CPU registers. $\gamma_c$ is used for obtaining the vco synchronization in the Software Controlled Phase Locked Loop Routine (SCPLLR). As shown in the flowchart (FIG. 3), the execution of the interupt service routine takes less than 65 microseconds.

CNT1 is used for obtaining the desired firing angle at each gating interval and is reloaded 6 times per cycle. The $\alpha$ counter is loaded and restarted just after the match between $\cos \alpha - 0.5\ I_{op}$ and the desired output voltage is found. In order to avoid accumulation of 0.5° errors, as a result of possible missing counts during counter reload, CNT1 is reloaded with a value which is calculated based on the content of CNT0 and the knowledge of the specific gating pattern just issued.

For the cases where $\alpha$ is greater than or equal 60 degrees, the above mentioned two counters are the only ones required. For the values of $\alpha$ less than 60 degrees, the firing pattern is first issued followed by a delay angle of $60 - \alpha°$ before a new comparison cycle can start. In this case, the third counter CNT2, which is programmed in a single shot mode, is used to time out the $60 - \alpha°$, interval.

Figure 3:
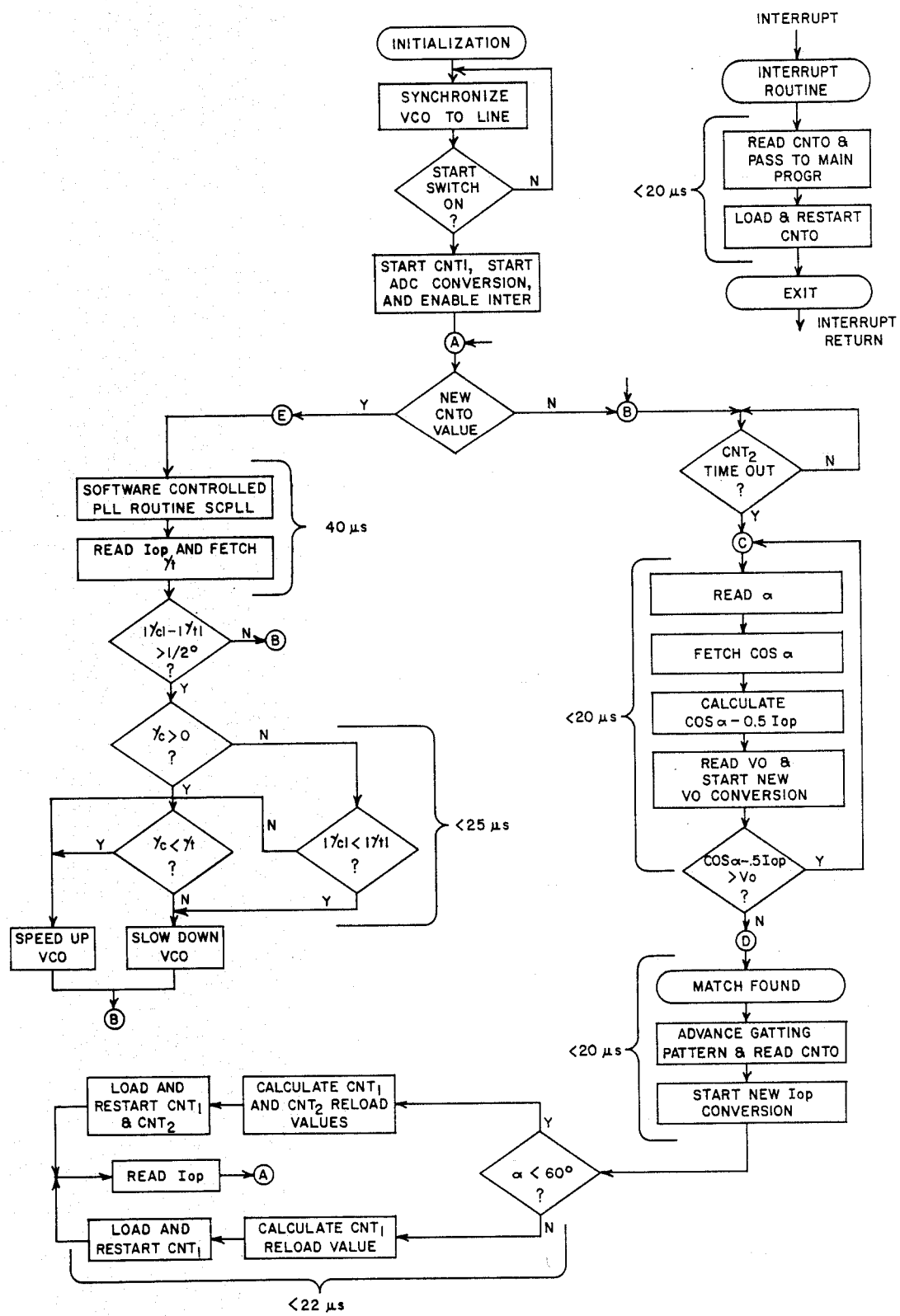
FIG. 3: Flow Chart for Control Circuit Program

A flowchart describing the logical flow of the software routine is shown in FIG. 3. After initialization, the VCO is synchronized to the line. This involves checking the status of the zero crossing detector flip flop until it is set, then, reading CNT0, comparing the read value with zero ($\gamma t = 0$) and adjusting VCO frequency accordingly. At the end of this routine, the VCO frequency is locked at $720 \times f_m$ and CNT0 counts the 0.5 degrees angles starting at the zero crossing point of $V_{AB}$. After each synchronization, the processor checks the status of start signal continuously until the start signal is detected. Notice that interrupts are disabled during power up.

Normal circuit operation begins by enabling CNT1, enabling interrupts, starting the conversion in both ADC's, and checking whether the zero crossing interrupt service routine has passed a newly read value for $\gamma c$. If a new value is not found, the main loop is entered. (Point A in the flowchart). The main loop begins by continuously checking the output of the single shot counter CNT2 until it is timed out. Then, starting at point B in the flowchart, the execution of the comparison routine begins. This routine tries to find $\alpha$ by continuously comparing $\cos \alpha - 0.5\ I_{op}$ and the desired output voltage. This requires reading CNT1, using the read value to fetch $\cos \alpha$ from the table, obtaining the R.H.S. of Eqn. (1), reading the desired output voltage through an ADC and comparing that to the calculated R.H.S. of Eqn. (1). The loop is repeated until a match has been found, i.e., when the R.H.S. of Eqn. (1) calculated at that instant is less than or equal to the desired output voltage. The value of $\alpha$ for this comparison cycle is determined by the last read value of CNT1.

Upon finding the match, the execution of the match-found routine (point D in the flow chart) is started. It advances the gating pattern and checks whether $\alpha$ is less than, equal to, or greater than 60°. In both cases, the new value to be loaded in CNT1 is calculated. If the current value of $\alpha$ is less than 60°, the content of the CNT1 counter is not valid for the interval of $60-\alpha$ deg. In this case, CNT2 is also loaded to time out the $60-\alpha$ deg. interval.

After the Match-Found Routine, a jump is made to point A in the flowchart to find whether the interrupt service routine has passed a new value for $\gamma c$, through a dedicated CPU register. If a new value has been passed, the execution of SCPLLR (point E in the flowchart) begins. This routine synchronizes CNT0 with the zero crossing of $V_{ab}$. This involves comparing $\gamma_c$ and $\gamma_t$ obtained from table and adjusting the vco frequency correspondingly. The address used in accessing the look up table is obtained by using the current value of $\alpha$ and the value of $I_{op}$ read from the corresponding ADC. If $\gamma_t$ and $\gamma_c$ differ more than 0.5°, the vco frequency is appropriately and correspondingly adjusted by increasing or decreasing the binary value stored in the output port driving the DAC which controls the vco frequency.

The 8086 CPU is a 16-bit processor with a rich instruction set, which allows the execution of the comparison loop in less than 20 microseconds when running under a 5 MHz clock. With the availability of the 10 MHz version of 8086 CPU or a new microprocessor, it is easily possible to reach a resolution of ¼ or less, provided that faster peripheral chips are also used. The cost of fast microprocessors and digital hardware are constantly declining, thus making this approach reasonably inexpensive to implement.

Experimental Results

The preferred embodiment uses a three phase 110 V bridge supply with a per phase commutation inductance of 0.8 MH. The microprocessor system is used as an open loop output voltage controller.

Figure 4A:
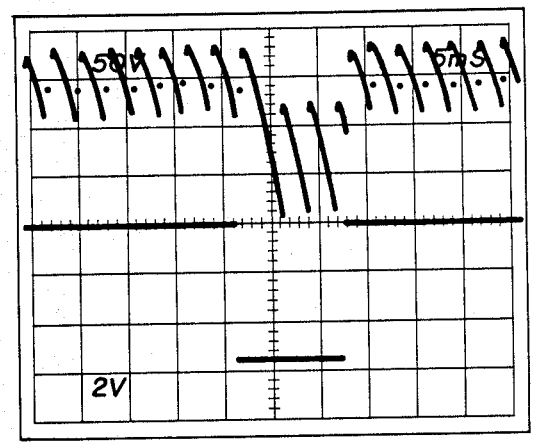
FIGS. 4a-b: System Response to a Step Change in the Input Control Voltage
Figure 4B:
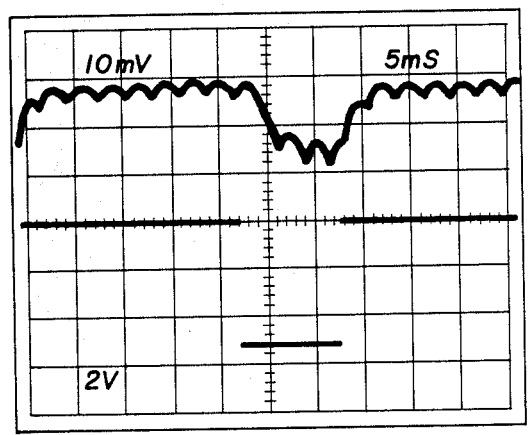

FIG. 4 shows the system response to a step change in the input control voltage (from 0.8 per unit to 0.48 per unit). FIG. 4(a) comprises trace (a), a variation of per unit input control voltage Hor. 5 mSec/div, Ver 0.2 pu/div and trace (b), a variation of output voltage Hor. 5 mSec/div Ver. 50 v/div. FIG. 4(b) comprises trace (a), a variation of per unit input control voltage Hor. 5 mSec/div, Ver 0.2 pu/div and trace (b) a variation of output current Hor. 5 mSec/div.Ver 10 A/div. It can be seen that the controller varies the $\alpha$ in the first 60° interval following the sudden change in the input control voltage. The fast response of the system enhances the bandwidth and increases the stable operating region of the system if a closed loop feedback control is used, Sucena-Paiva and Freris, "Stability of rectifiers and voltage-controlled oscillator firing systems.", Proc. IEE, Vol. 120, No. 6, pp. 667-674, June 1973.

Figure 5:
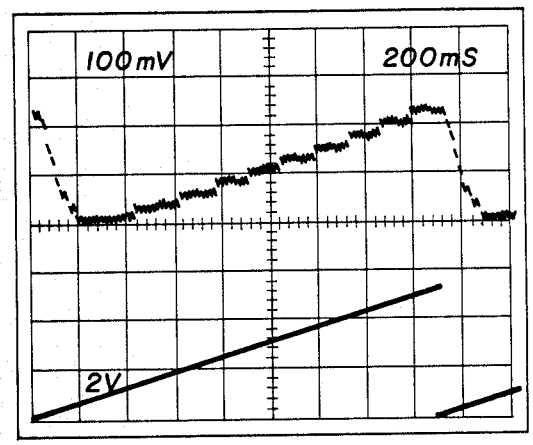
FIG. 5: Input Voltage to the VCO Generating 0.5° Clocks ($p^{LL}$ performance)

In order to show the performance of the system fed by a source voltage of unregulated frequency, a sine wave FM modulated signal with a center frequency of 60 Hz and a frequency deviation of ±5 Hz is connected to the input of the zero crossing detector circuit. The sweep signal is generated by a signal generator with a sawtooth waveform connected to its frequency modulation input. FIG. 5 shows the input voltage to the vco which generates 0.5° clocks along with the modulating sawtooth signal. FIG. 5 comprises trace (a), a sawtooth waveform applied to the FM modulation input of the sweep generator. Hor. 200 mSec/div, Ver. 2 V/div and trace (b), a VCO input voltage Hor. 200 m/Sec/div, Ver. 100 mV/div. As this figure shows, the vco tracks the input frequency and locks in less than 150 mSec. This enables the phase controled rectifier unit to be fed from an unregulated frequency source. The maximum tracking frequency can be further increased by using a 12 bit DAC.

What I claim is:

1. A method of controlling a six pulse bridge phase controlled rectifier using a microprocessor comprising the steps of:
    (a) synchronizing an oscillator to a frequency of an ac power source wherein said oscillator frequency is a multiple of said power source frequency;
    (b) driving a first counter with said oscillator;
    (c) driving a second counter with said oscillator;
    (d) executing a delay angle match routine for a value of said second counter, said match routine comprising:
        (i) determining a cosine of $\alpha$ wherein $\alpha$ is a delay angle corresponding to said value of said second counter;
        (ii) reading a desired output voltage;
        (iii) determining whether said output voltage is greater than or equal to cosine $\alpha$ minus an inductance factor;
        (iv) repeating said match routine for a successive value of said second counter;
    (e) exiting said match routine when said output voltage is greater than or equal to cosine $\alpha$ minus said inductance factor, and advancing a gating pattern of said rectifier;
    (f) calculating a reload value of said second counter based upon a solution value of $\alpha$ when said gating pattern was advanced, whereby a number of counts of said second counter from said reload value to a value corresponding to said solution value of $\alpha$ projects a subsequent gating pattern advancement in 60° of said power source's cycle;
    (g) reloading said second counter with said reload value;
    (h) determining whether a zero crossing has occurred, an occurrence of which indicates a value of said first counter has been read and said first counter has been reset;
    (i) if said zero crossing has occurred, comparing said value of said first counter to a previous value of said counter to determine if said first counter needs to be synchronized to said power source frequency;
    (j) if said first counter needs to be synchronized, adjusting said oscillator frequency via a phase locked loop subroutine; and
    (k) resuming said match routine.

2. A method according to claim 1 wherein a period of time corresponding to $60°-\alpha$ is timed out on a third counter before said match routine is executed when $\alpha$ is less than 60°.

3. A method according to claim 2 wherein said zero crossing of said power source is measured across said rectifier and said first counter is synchronized to an actual zero crossing by adding an angle $\gamma$, said angle $\gamma$ being a function of output current and $\alpha$.

4. A method according to claim 3 wherein the voltage of a single phase is measured to detect said zero crossing.

5. A method according to claim 4 wherein said iteration of said match routine takes less than 20 microseconds.

6. A method according to claim 5 wherein said oscillator frequency is 720 times said power source frequency.

7. A method according to claim 6 wherein said inductance factor is 0.5 times the output current.

8. A method according to claim 7 wherein said oscillator is a voltage controlled oscillator.

* * * * *